April 13, 1965 H. H. STRYKER 3,178,574
LOCATING APPARATUS FOR DETERMINING THE POSITION OF
THE NECK OF A FEMUR UNDER X-RAY EXAMINATION
Filed July 12, 1962 3 Sheets-Sheet 1

INVENTOR.
HOMER H. STRYKER
BY
*Woodhams, Blanchard & Flynn*
ATTORNEYS

April 13, 1965 H. H. STRYKER 3,178,574
LOCATING APPARATUS FOR DETERMINING THE POSITION OF
THE NECK OF A FEMUR UNDER X-RAY EXAMINATION
Filed July 12, 1962 3 Sheets-Sheet 2
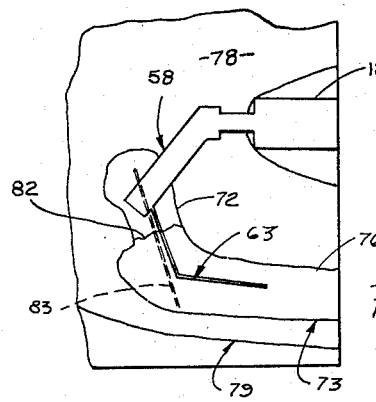
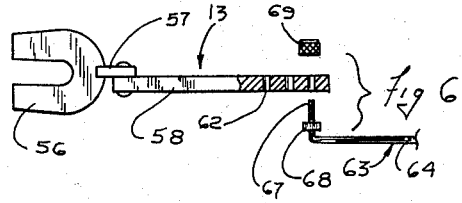
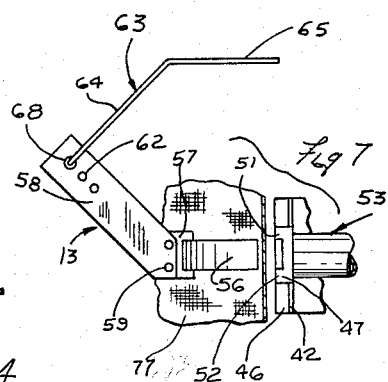
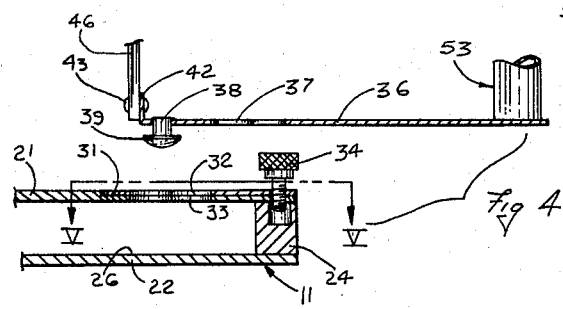
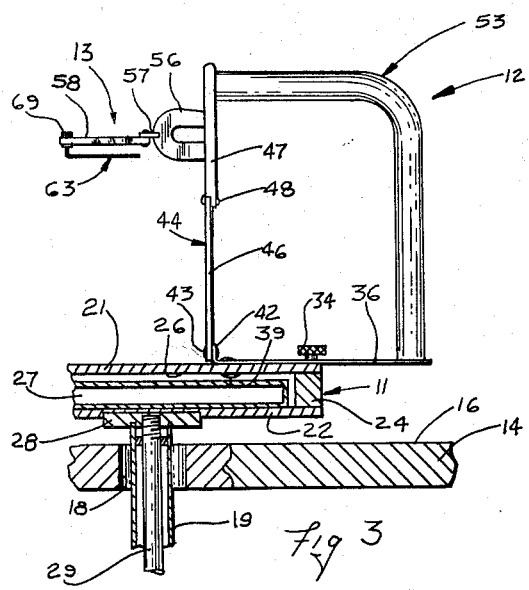
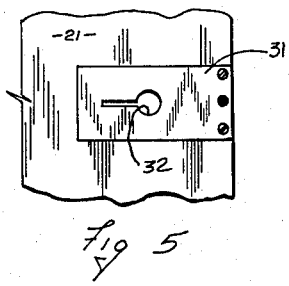
INVENTOR.
HOMER H. STRYKER
BY
ATTORNEYS April 13, 1965   H. H. STRYKER   3,178,574
LOCATING APPARATUS FOR DETERMINING THE POSITION OF
THE NECK OF A FEMUR UNDER X-RAY EXAMINATION
Filed July 12, 1962   3 Sheets-Sheet 3
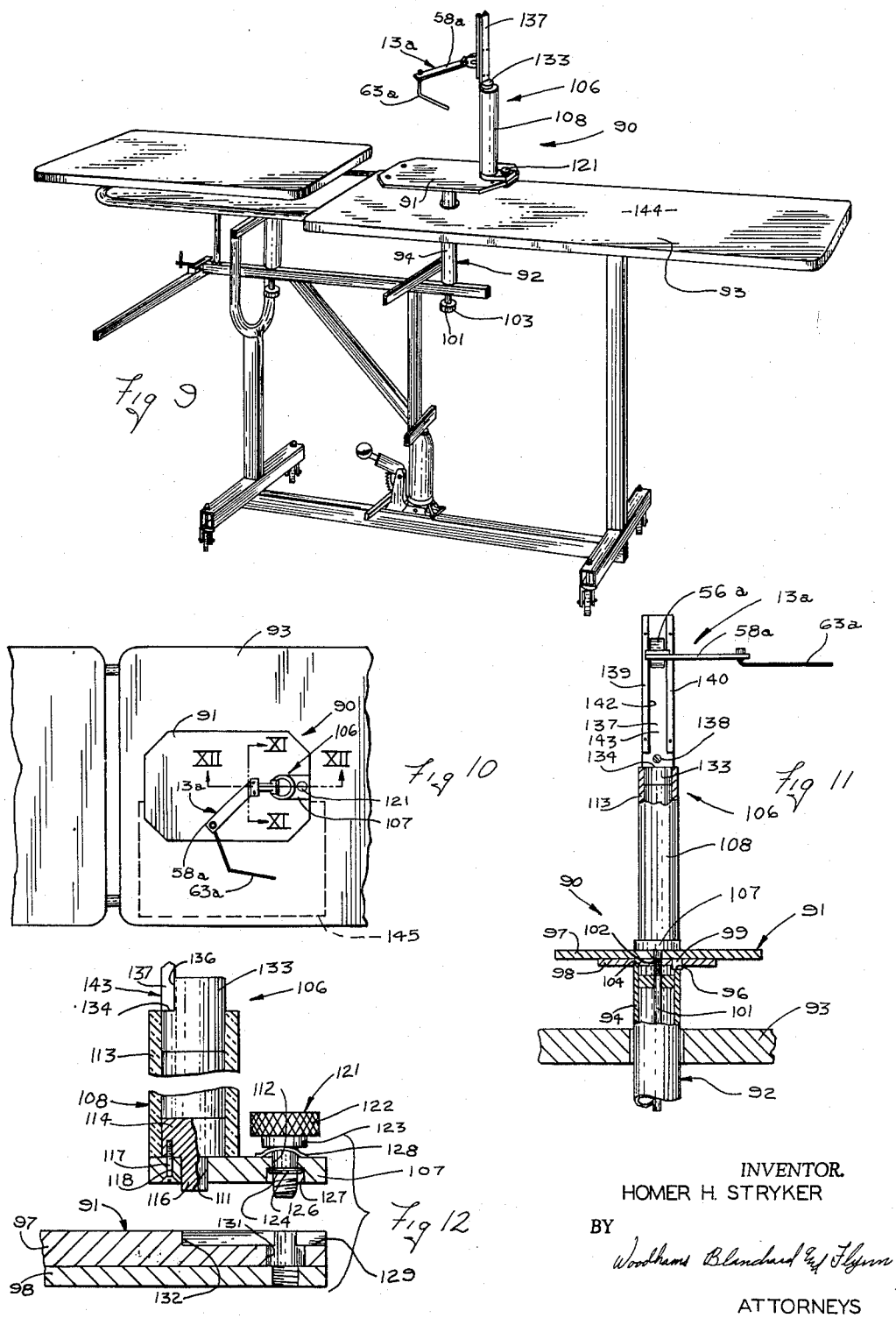
INVENTOR.
HOMER H. STRYKER
BY
Woodhams Blanchard & Flynn
ATTORNEYS

United States Patent Office 3,178,574
Patented Apr. 13, 1965

3,178,574
LOCATING APPARATUS FOR DETERMINING THE POSITION OF THE NECK OF A FEMUR UNDER X-RAY EXAMINATION
Homer H. Stryker, Kalamazoo, Mich., assignor to Stryker Corporation, a corporation of Michigan
Filed July 12, 1962, Ser. No. 209,349
4 Claims. (Cl. 250—59)

This invention relates in general to an apparatus for locating the position of an element within a human body by reference to the position of a part of said apparatus which is adjacent the external surface of said body. More particularly, the invention relates to an apparatus mountable upon a fracture or cast table and engageable with a portion of a patient supported on said table to locate the position of a broken bone so that the parts thereof can be accurately connected by wire, nails or the like.

There are certain types of fractures which are more likely to heal properly if the portions of the bone on opposite sides of the fracture are wired or nailed together. More specifically, it is often difficult without the use of nails, wire or the like to prevent relative movement between two parts of a fractured bone, especially during the early stages of the healing process, even though the injured portion of the patient is placed in a cast. On the other hand, it is desirable because it tends to induce early ambulation, rapid convalescence and recovery. Certain types of fractures would not permit early ambulation, if the bones could not be wired or nailed. Moreover, proper mending of some fractures cannot be reasonably assured unless wire or nails are used to hold the bone in position after it is set.

Certain human bones or parts of human bones, such as the upper end of a femur, are located in fleshy parts of the body. Thus, they are not only difficult to locate, but a considerable amount of additional surgery may be required before such location can be accurately determined. This problem also exists to various degrees in other ports of the body. However, specific reference will be made herein for illustrative purposes to the use of the invention for locating fractured femurs because this is the particular problem which gave rise to the invention.

Where the neck of the femur is fractured, the orthopedic surgeon usually sets the bone, after which X-ray photographs are taken. If the photographs indicate that the setting, also referred to as the reduction, has been satisfactory, then an incision is made in the hip adjacent the neck of the femur and in alignment with the lengthwise extent of the neck. It is common practice to drill an opening through the shaft of the femur and lengthwise of the neck of the femur, after which a wire and then a nail are inserted into the opening, and the nail is rigidly secured in place. It is often very difficult to determine the position of the neck of the femur, so that the opening may not be drilled in the best or strongest position. That is, with existing procedures the surgeon can not be sure that he is drilling at the proper point or angle, even though he can refer to the X-ray films, unless he makes a very extensive incision, which is not desirable. The X-ray photographs do not normally contain reference marks which indicate the precise location or angular relationship of the neck of the femur with respect to a visible part of the patient.

Accordingly, the primary object of this invention has been the provision of an apparatus for determining the location of an element, and particularly a bone, within a human body by reference to the location of a position on the surface of said body for the purpose of conducting an operation on said element.

A further object of this invention has been the provision of an apparatus, as aforesaid, including a directional guide member which is removable, which is engageable with the body of the patient near the element to be treated, and an image of which will appear on the X-ray film.

A further object of this invention has been the provision of an apparatus, as aforesaid, which is easy to mount upon or remove from a cassette tunnel for the purpose of locating the element and the human body with respect to the film.

A further object of this invention has been the provision of an appartus, as aforesaid, which is relatively simple in construction, which is relatively easy to sterilize, which can be easily and quickly adjusted to the particular needs involved, and which can be mounted as easily above as below the sterile drapes placed over the patient before the operation is performed.

Other objects and purposes of this invention will become apparent to persons familiar with this type of equipment upon reading the following descriptive materials and examining the accompanying drawings, in which:

FIGURE 3 is a broken, sectional view taken along the line III—III in FIGURE 2.

FIGURE 4 is an exloded, sectional view taken along the line IV—IV in FIGURE 2.

FIGURE 5 is a sectional view taken along the line V—V in FIGURE 4.

FIGURE 6 is a broken and exploded, side elevational view of the pointer for the positioning apparatus.

FIGURE 7 is a fragmentary and exploded, top view of said apparatus with the pointer in the reverse position from that appearing in FIGURE 2.

FIGURE 8 is a plan view of a fragment of an exposed X-ray film showing the upper end of a femur and the pointer of the apparatus in superimposed positions.

FIGURE 9 is a perspective view of an apparatus embodying an alternate embodiment of the invention in association with a fracture table for supporting a patient.

FIGURE 10 is a top plan view of said alternate apparatus including a fragment of said table.

FIGURE 11 is a sectional view taken along the line XI—XI in FIGURE 10.

FIGURE 12 is a broken and exploded sectional view substantially as taken along the line XII—XII in FIGURE 10.

Figure 1:
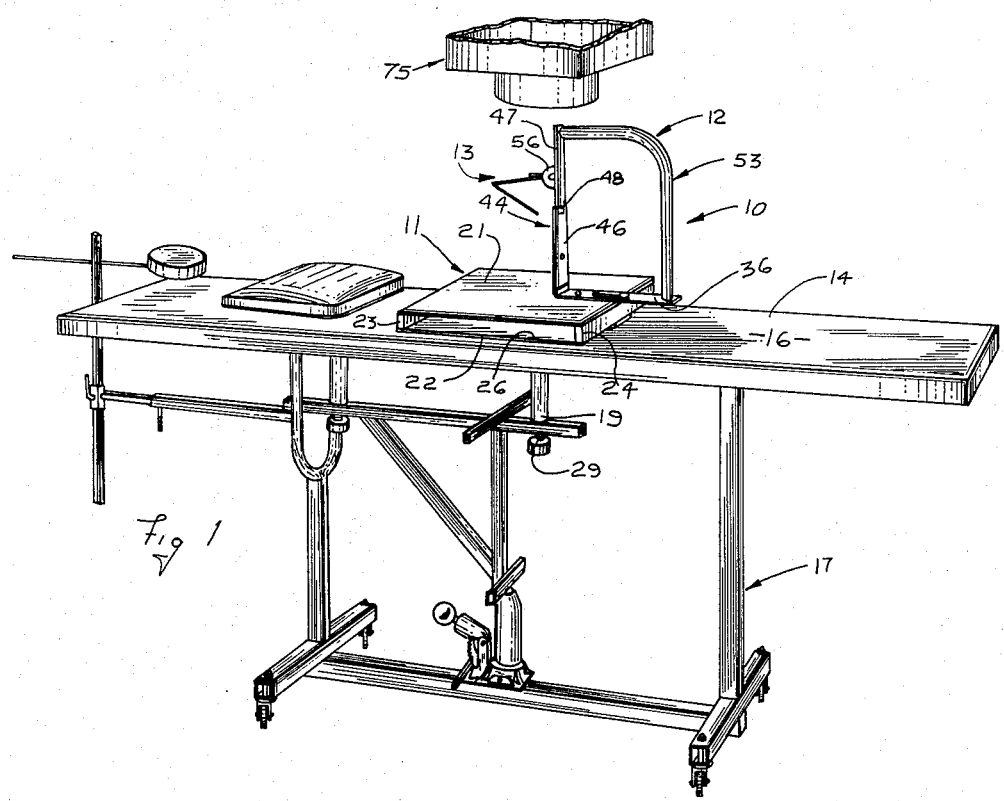
FIGURE 1 is a perspective view of an apparatus embodying the invention in association with a fracture table for supporting a patient.
Figure 2:
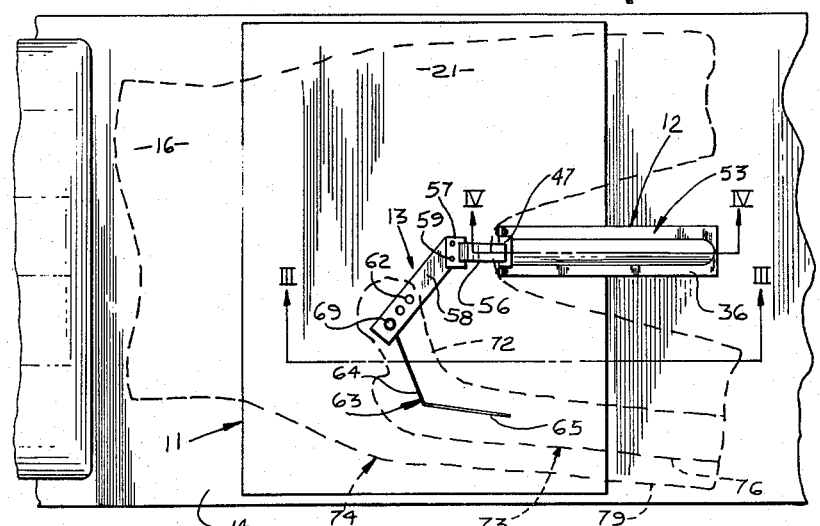
FIGURE 2 is a top plan view of said apparatus and a fragment of said table, upon which a potrion of a patient appears in broken lines.

For convenience in description, the terms "upper," "lower" and words of similar import will have reference to the apparatus of the invention as appearing in FIGURES 1 and 2, which disclose the apparatus in its normal position of operation. The terms "inner," and "outer" and derivatives thereof will have reference to the geometric center of said apparatus and equipment associated therewith.

GENERAL DESCRIPTION

The objects and purposes of the invention, including those set forth above, have been met by providing a positioning apparatus which can be removably supported upon a device, such as a cassette tunnel, for holding an X-ray film. The cassette tunnel is in turn preferably designed and constructed for mounting upon a fracture table of the type used to support a patient on whom orthopedic surgery is to be performed.

The positioning apparatus consists of an upright member removably mounted upon the cassette tunnel so that said member can be comfortably and snugly held against the perineum of a patient disposed upon the table in either the prone or the supine position. The upright member in arranged upon the cassette tunnel so that the region of the patient's pelvis, including the upper ends of the femurs, will be directly above the portion of the cassette tunnel into which the X-ray film can be received for exposure thereof. The positioning apparatus also includes an adjustable pointer which is removably supportable upon the upright member for movement into a variety of positions with respect to said patient.

An alternate positioning apparatus includes a modified upright member which is mounted upon the sacral rest plate in place of the conventional perineal post.

DETAILED CONSTRUCTION

The positioning apparatus 10 (FIGURES 1 and 2), which has been selected to illustrate a preferred embodiment of the invention, is comprised of a cassette tunnel 11 upon which the upright member 12 is removably mounted. A pointer 13 is removably and adjustably supported upon the upright member 12.

The cassette tunnel 11 (FIGURE 1) may be part of, or removably mounted upon, a fracture table 14 which may, by way of example, be of the type used by orthopedic surgeons. In this embodiment, the table 14 has a top 16, which is supported upon a base structure 17 for vertical adjustment with respect thereto. The table top 16 (FIGURE 3) has, about midway between its ends, a central opening 18 through which a sacral rest support 19 is slidably received. The table 14 may be of a substantially conventional type, so that further detailed disclosure thereof is not required.

The cassette tunnel 11 has a top wall 21, which also serves as a sacral rest, and a bottom wall 22 which are parallel and closely spaced. A pair of narrow side walls 23 and 24 extend between and are secured to the corresponding, opposite edges of the top and bottom walls 21 and 22. The tunnel 11 is preferably arranged upon the top 16 so that the passageway 26 therethrough extends crosswise of the table top to facilitate the loading and unloading of said tunnel with a film cassette 27. A connecting plate 28 is mounted upon the central portion of the bottom wall 22 for removably securing the cassette tunnel to the threaded end of the rod 29 extending through the upper end of the rest support 19.

A flat base plate 31 (FIGURES 4 and 5) is rigidly secured to the top wall 21 of the cassette tunnel 11 adjacent the side wall 24 and preferably midway between the lengthwise ends thereof. Said plate 31 has a keyhole-shaped opening 32 which is spaced from the side wall 24 and communicates with a corresponding opening 33 in the top wall 21 of said tunnel 11. The large end of the keyhole opening 32 is nearest to the side wall 24. A thumb screw 34 is threadedly received into the base plate 31 adjacent said side wall 24. It will be apparent that, where the top wall 21 is made of sufficiently rigid material, the separate base plate 31, which provides additional strength, may be unnecesary. That is, the screw 34 may be threadedly received directly into the top wall 21.

The upright member 12 has a substantially flat and rectangular mounting plate 36 with a keyhole-shaped opening 37 therethrough. The large end of the keyhole opening 37 is of sufficient size to slidably receive the head of the thumb screw 34 therethrough, and the slender portion of said keyhole opening 37 can slidably receive the shank of said thumb screw 34. The mounting plate 36 has a pin 38 extending downwardly from the lower side thereof at a distance from the keyhole opening 37 substantially equal to the distance between the shank of the screw 34 and the keyhole opening 32 on the base plate 31. The pin 38 has a head 39 which is spaced from the mounting plate 36 a distance slightly greater than the thickness of the base plate 31. The large end of the keyhole opening 37 is nearest to the pin 38. Thus, the mounting plate 36 can be mounted upon the cassette tunnel 11 by inserting the pin head 39 into the opening 32 and simultaneously guiding the screw 34 through the opening 37. The mounting plate 36 is moved with respect to the base plate 31 toward the side wall 23 so that the pin 38 and the shank of the screw 34 move into the slender portions of their respective openings 32 and 37. The thumb screw 34 is then tightened against the mounting plate 36, whereby the mounting plate is rigidly held upon the base plate 31, hence upon the cassette tunnel 11.

The mounting plate 36 (FIGURE 3) has an integral, upwardly extending flange 42 at the end thereof adjacent the pin 38, which flange is secured by means, such as the screw 43, to the lower end of the perineal post 44. In this particular embodiment, the post 44 (FIGURES 1, 3 and 7) has an elongated and flat lower portion 46, which is preferably fabricated from a material, such as a phenolic laminate, through which X-rays can pass without material reduction of intensity and without producing distortions or shadows in an exposed film located behind said lower portion.

The upper portion 47 (FIGURES 3 and 7) of the post 44 is elongated, channel-shaped and preferably fabricated from a magnetizable metal, such as steel. Said channel portion 47 rigidly secured at its lower end by the screw 48 to the upper end of the flat portion 46. The flanges 51 and 52 (FIGURE 7) on the channel portion 47 are notched at their lower ends to receive the upper end of the flat portion 46 and to strengthen the connection between these portions. The free edges of the flanges 51 and 52 are preferably flush with the adjacent surface of the lower portion 46.

An L-shaped brace 53 (FIGURES 1, 2 and 3), which is preferably fabricated from rigid tubing, has a horizontal part which is rigidly secured at its free end to the upper end of the upper portion 47 on the opposite side thereof from the flanges 51 and 52. The lower end of the vertical part of said brace 53 is rigidly secured to the mounting plate 36 near the end thereof remote from the flange 42. The mounting plate 36, post 44 and brace 53 are arranged so that they define a rectangle, which is substantially parallel with a plane perpendicular to the cassette tunnel 11 when the mounting plate 36 is securely mounted upon the base plate 31.

The pointer 13 (FIGURES 1, 2, 6 and 7) has a U-shaped support member 56 which is magnetized like a horseshoe magnet. The prongs of the member 56 are engageable with the channel portion 47 of the post 44 between the flanges 51 and 52 thereon, for sliding movement lengthwise thereof. Thus, support member 56 is held upon the upper portion 47 of the post 44 by mnagnetic attraction. A bracket 57 is rigidly secured, as by welding, to the closed end of the support member 56. An arm 58 is rigidly secured to the bracket 57, hence to the support member 56, by screws 59 preferably so that the arm 58 extends at an angle of about 45 degrees away from the plane which is substantially defined by the U-shaped member 56.

The arm 58 (FIGURE 6) of the pointer 13 has one or more, here three, openings 62 therethrough near the outer end thereof, which openings extend in a direction substantially parallel with the plane defined by the member 56. Accordingly, the axes of the openings 62 are substantially parallel with the lengthwise extent of the post 44 when the pointer 13 is mounted thereon (FIGURES 1 and 3). A locating rod 63, which is preferably bent approximately midway between its ends thereof, is mounted upon the arm 58. That is, the rod 63 has an inner part 64 and an outer part 65 which, in this particular embodiment, are disposed so that they define an included angle of 134 degrees.

The inner end portion 67 (FIGURE 6) of the inner part 64 is bent at right angles to the plane defined by the parts 64 and 65 for slidable reception through any one of the openings 62. A stop collar 68 is sleeved upon and rigidly secured to the end portion 67 spaced from the free end thereof. Said end portion 67, which is threaded between the tip thereof and the stop collar 68, is of sufficient length that it will extend substantially through the arm 58 for threaded engagement by a knurled nut 69. Accordingly, when the nut 69 is loosened, the locating rod 63 can be pivoted around the axis of the end portion 67 into any desired position with respect to said arm 58 and thereafter locked in position by tightening the nut 69.

The pointer 13 is intentionally and precisely constructed so that the outer end of the arm 58 will extend across the center line of the neck 72 (FIGURES 2 and 8) on the femur 73 of the patient 74 who is disposed in the prone or supine position upon the table 14 with his perineum against the perineal post 44. The openings 62 are located in the arm 58 so that the inner part 64 of the rod 63 can be positioned directly above and substantially parallel with the center line of the neck 72 (FIGURE 2) when the end portion 67 of said part 64 is disposed in one of said openings 62. Accordingly, the position of the rod 63 can be adjusted for femurs and/or patients of different sizes and shapes.

The included angle of 134 degrees between the parts 64 and 65 is selected because it is the average included angle between the neck 72 and shaft 76 of an average femur 73, as such femur appears when it is projected onto a flat surface beneath a patient in the prone or supine position. Thus, by adjusting the locating rod 63 so that the part 64 thereof is parallel with the neck 72, the part 65 will automatically be at least substantially parallel with the shaft 76, and vice versa. A conventional sterile drape 77 can be placed over the patient and the upright member 12, after which the pointer 13 can be mounted (by magnetic attraction) upon the post 44 on the outer or upper side of the drape, for easy reference by the surgeon during the operation.

FIGURE 8 illustrates a fragment of an exposed X-ray film 78 in which the upright member 12 and pointer 13 are superimposed upon the upper end of the femur 73 in the leg 79 of the patient. For the purpose of illustrating the operation and function of the invention, a fracture 82 is shown in the neck 72. The parallel broken lines 83 indicate the opening which is drilled into the shaft 76 and thence lengthwise through the neck 72 for the purpose of receiving a metallic wire and/or nail to hold the portions of the neck 72 on opposite sides of the fracture 82 against movement with respect to each other after a proper reduction of the fracture has been accomplished by appropriate manipulation of the leg 79.

OPERATION

In preparing for use and operation of the positioning apparatus 10, the cassette tunnel 11 is mounted upon the rest support 19 (FIGURE 3) by threadedly attaching the rod 29 to the plate 28, after which the upright member 12 is made ready for mounting upon the cassette tunnel 11. The patient is placed upon the table 14, usually in the supine position, so that his buttocks are resting upon the cassette tunnel 11. The upright member 12 is then fastened to the cassette tunnel, after which the patient is moved, if necessary, so that his perineum is snugly against the perineal post 44. Alternatively, the patient may be placed upon the table 14 after the upright member 12 has been mounted upon the cassette tunnel 11.

The pointer 13 is mounted upon the perineal post 44 so that arm 58 (FIGURE 2) extends across the fractured neck 72. The injured leg 79 and the outer part 65 of the locating rod 63 are then positioned so that they are approximately parallel. This can be accomplished by visually aligning the part 65 with the thigh of the leg 79 which has the fractured femur. A cassette 27 containing an X-ray film is then placed within the cassette tunnel 11 directly below the fractured portion of the femur 73. A machine (part of which is shown at 75 in FIGURE 1) for generating X-ray radiation is then placed directly above the patient and the cassette tunnel 11 to expose the film in the cassette 27 in a conventional manner. The X-ray film, when it is developed as shown in FIGURE 8, will clearly show the relationship between the location of the rod 63 and the neck 72 of the injured femur 73. If the overlay of the rod 63 with the neck 72 is substantially as appearing in FIGURE 8, the pointer 13 and upright member can now be removed and sterilized, preferably without changing the relative positions of said rod 63 and said arm 58. Normally, the patient is then cleaned for surgery, after which the upright member is remounted upon the tunnel 11 and a sterile drape 77 is placed over with patient and over the upright member 12. The pointer 13 is mounted upon the perineal post 44 on the outside of the drape, and said pointer is then moved downwardly along said post, without changing the position of the locating rod 63, until the pointer 13 is snugly against the groin of the patient and directly above the injured femur.

Due to the fact that the support member 57 is connected to the post 44 by magnetic attraction, the drapes 77 can be disposed between the member 57 and the post 44, which is a very convenient arrangement for the surgeon while he is performing the operation. However, other types of releasable gripping devices may be used for removably supporting the pointer 13 upon the post 44, with the drape 77 therebetween, even though the effectiveness of such devices may be less than completely satisfactory.

If the locating rod 63 is accidentally moved during the sterilization and movement thereof, no material harm is done. That is, said locating rod 63 can be accurately repositioned by realigning the outer part 65 of said rod with the thigh and the injured leg, whereby the inner part 64 will be automatically realigned with the neck 72, just as it was when the X-ray film was exposed. Thus, with the pointer 13 in position upon the upright member 12 and closely adjacent the leg 79, the surgeon will have a positive reference by the location of the inner part 64 for guiding his drilling through the shaft 76 and along the neck 72 in preparing same for insertion of a wire and/or a nail therein.

By reference to the exposed film, such as that shown in FIGURE 8, the doctor can determine whether he should drill the hole into the femur 73 directly below the part 64 or to one side or the other of said part, and whether said drilling should be parallel with said part 64 or at a slight angle with respect thereto. Accordingly, a relatively small incision will be adequate in the leg 79 adjacent the point of entry of the opening 83 into the femur 73.

The angle of the drill insertion, with respect to the table top 16, can be determined by taking X-ray photographs in a horizontal direction through the leg 79. However, this does not involve the use of the positioning apparatus 10 and it can be accurately accomplished by existing devices for this purpose. However, the taking of such photographs and the accuracy of their disclosure is greatly facilitated by the fact that the perineal post 44 has a lower portion 46 which does not materially obstruct the transmission of X-rays.

ALTERNATE STRUCTURE

The alternate positioning apparatus 90 includes a sacral rest place 91 which is mounted upon the sacral rest support 92 (FIGURE 9) of the table 93. As in the case of the table 14 (FIGURE 1) the table 93 may be of a conventional type, the rest support 92 being a substantially standard part of the table. However, in this particular embodiment, the rest plate 91 and rest support 92 are modified, as shown in FIGURE 11, for the purpose of accurately orientating the rest plate 91 with respect to the rest support around the axis of the latter. More specifically, the rest support 92 (FIGURE 11) includes a vertical pipe 94 which has a notch 96 in the upper edge thereof. The rest plate 91 includes a flat upper member 97, which may be fabricated from fiberglass impregnated with resin, and a lower reinforcing member 98 which is preferably narrower in width and fabricated from steel. A locating pin 99 is embedded in, and projects downwardly from, the lower member 98 for snug reception into the notch 96.

A fastening rod 101 (FIGURE 11) extends upwardly through the pipe 94 and is threaded at its upper end for threaded reception into a threaded opening 102 in the lower surface of the lower member 98, when the pin 99 is disposed in the notch 96. The pipe 94 is rigidly secured to the undercarriage of the table 93 (FIGURE 9) and a manually engageable handle 103 is secured to the lower end of the rod 101 for the purpose of rotating same. An annular recess 104 may be provided in the lower surface of the lower member 98 concentric with the threaded opening 102 for the purpose of receiving the upper end of the pipe 94 and holding same against lateral movement with respect to the rest plate 91.

The positioning apparatus 90 (FIGURE 9) includes an upright member 106 which is comprised of an elongated mounting plate 107 and a perineal post 108 secured to and extending upwardly from said mounting plate 107 near one end thereof. The mounting plate 107 has a pair of spaced, preferably smooth-bore openings 111 and 112, which are axially parallel and located near the opposite ends of said mounting plate.

The perineal post 108 (FIGURE 11) includes at its lower end a hollow cylinder 113 (FIGURE 12) which is preferably made from fiberglass combined with a synthetic resin binder so that it is transparent to and does not distort X-rays. A metal plug 114 is snugly received into the lower end of cylinder 113 where it is rigidly held by means such as cement. The plug 114 has an integral and coaxial pin 116 which extends downwardly from said cylinder 113 and snugly through the opening 111, so that it projects a short distance, such as about one eighth of an inch, below the lower surface of the mounting plate 107, for reasons appearing hereinafter. The plug 114, hence the cylinder 113, are rigidly held in place against the upper surface of the mounting plate 107 by means, such as a screw 117, which is slidably received through an opening 118 for threaded engagement with the plug 114.

A screw 121 (FIGURE 12), which is slidably received through the opening 112 in the mounting plate 107, has a knurled head 122 and a shoulder 123, both of which are larger in diameter than the opening 112. The shank of the screw 141 is provided with an annular groove 124 which is spaced from the shoulder 123, a distance at least substantially equal to the thickness of the mounting plate 107, for snug reception thereinto of a snap ring 126. The lower end of the opening 112 in the mounting plate 107 has a counterbore 127 into which the snap ring 126 can be slidably received when the screw 121 is raised with respect to the plate 107. The shank of the screw 117 is encircled by a spring type washer 128, which is located between the shoulder 123 and the adjacent surface of the mounting plate 107, whereby the screw 117 is continuously urged upwardly into its FIGURE 12 position. The snap ring 126 prevents accidental dislodgment of the screw 121 from the mounting plate 107.

The upper surface of the rest plate 91 (FIGURE 12) contains a groove 129, which preferably extends a short distance from the foot end of the rest plate 91 toward the head end of said rest plate. An opening 131 which in the rest plate 91 has an axis which intersects the lengthwise axis of the groove 129. The opening 131 has an enlarged upper end into which the snap ring 126 can be received as the screw 121 is threadedly received into the threaded lower end of the opening 131. The spring washer 128 (FIGURE 12) normally holds the screw 121 so that it projects downwardly from the mounting plate 107 a distance which is less than the depth of the groove 129.

The end 132 (FIGURE 12) of the groove 129 is spaced from the opening 131 in the rest plate 91 so that the screw 121 will be axially aligned with the screw opening 131 when the pin 116 is snugly against the inner end 132 of said groove 129. Thus, alignment of the screw 121 and opening 131 is easily achieved by movement of the mounting plate 107 transversely of the groove 129 until the pin 116 and screw 121 both drop into the groove 129. Thereafter, the mounting plate 107 is moved lengthwise of the groove 129 until the pin 116 engages said inner end 132 of said groove, whereby the screw 117 is automatically aligned with the screw opening 131. The screw 121 is then urged downwardly, against the contrary urging of the washer 128, until the threaded end of the screw 121 is threadedly received into the threaded opening 131. The screw 121 is then turned until the mounting plate 107 is clamped tightly between the shoulder 123 on said screw and the upper surface of the rest plate 91.

A solid, cylindrical plug 133, which is preferably fabricated from metal, is partially and snugly received into the upper end of the cylinder 113 where it is rigidly held by cement. A notch 134 is cut in the side wall of the plug 133, which extends above the cylinder 113, to provide a flat, upright mounting surface 136. The lower end of the bar 137, which comprises the upper portion of the perineal post 108, is rigidly held against the surface 136 by means, such as the screw 138 (FIGURE 11). The bar 137 is preferably fabricated from a magnetizable material, such as steel, and is rectangular in shape. A pair of spaced and parallel guides 139 and 140 are rigidly secured to the same side of the bar 137 along the lengthwise edges thereof to define a channel 142 therebetween. The notch 134 is arranged on the plug 133 so that the bottom 143 of the channel 142 defines a plane which is perpendicular to the lengthwise extent of the sacral rest plate 91. Thus, in view of the pin 99 and notch 96 arrangement between the rest plate 91 and the pipe 94, said bottom surface 143 is also perpendicular to the lengthwise extent of the top 144 of the table 93. This arrangement becomes important in the use of the apparatus.

A pointer 13a, which may be identical with the pointer 13 described above, includes a magnetized support member 56a, and support arm 58a and a locating rod 63a, which may be identical with their counterparts in the pointer 13. The patient is supported with his buttocks upon the sacral rest plate 91 and with his perineum against the perineal post 108. The pointer 13a is mounted upon the surface 143 within the channel 142 of the post 108. The alternate positioning apparatus 90 can then be used by the surgeon to determine accurately the proper location for the incision and the angle of drilling, which he must carry out, in substantially the same manner as discussed above with respect to the positioning apparatus 10.

As indicated above, the entire upright member 106 can be quickly removed from the sacral rest plate 91 by loosening the screw 121. The cylinder 113 of the perineal post 108 and the upper member 97 of the sacral rest support 92 are preferably fabricated from materials which are capable of passing X-rays without casting shadows upon the X-ray plates. This greatly facilitates the accuracy of the X-ray photographs.

An X-ray cassette indicated in broken lines at 145 (FIGURE 10), can be placed upon the table top 144 adjacent and partially beneath the sacral plate 91 for an anterior-posterior X-ray photograph of the patient supported upon the sacral rest plate. The substance of the photographic procedure may be the same as that decribed above with respect to the positioning apparatus 10.

It will be apparent that, although the invention has been disclosed herein for use in performing an operation upon a fractured femur, said invention could be readily modified for similar use in performing operations upon other parts of a patient, such as fractured bones in the patient's shoulders. Moreover, the invention can be adapted for use to locate within the patient a foreign object, which is opaque to X-rays and thereby facilitate the operation performed to remove such object.

Thus, although particular embodiments of the invention have been disclosed herein for illustrative purposes, it will be understood that variations or modifications of such disclosure, which come within the scope of the appended claims, are fully contemplated.

What is claimed is:

1. An apparatus for determining the position of the neck of a femur in a patient by reference to a device located near the pelvic region of the patient reclining upon a table, comprising:
   a film holding device having a horizontal top wall, and means supporting said film holding device upon said table;
   an upright member having a perineal post, and means supporting said upright member upon said top wall of said film holding device with said post substantially perpendicular thereto, said post being engageable with the perineum of said patient and having an upper portion;
   a support arm including holding means engageable with said upper portion of said post for holding said arm on said post when said arm is in a position substantially parallel with said top wall; and
   an elongated element adjustably secured to said arm at a point thereon spaced from said holding means for movement with respect to said arm in a plane parallel with said top wall when said arm is in said position, said element having a pair of integral and adjacent sections defining an included angle approximately equal to the included angle between the neck and shaft of a femur.

2. An apparatus for determining the position of the neck of a femur in a patient by reference to a device located near the pelvic region of the patient reclining upon a table, comprising:
   a cassette tunnel having a horizontal top wall, and means removably supporting said cassette tunnel upon said table;
   an upright member having a perineal post, and means removably supporting said upright member upon said top wall of said cassette tunnel with said post substantially perpendicular thereto;
   said post being engageable with the perineum of said patient and having a magnetizable portion;
   a support arm including a magnet at one end, said magnet being engageable with said portion of said post and being held thereon by magnetic attraction when said arm is in a position substantially parallel with said top wall; and
   an elongated element adjustably secured to said arm at a point thereon spaced from said magnet for movement with respect to said arm in a plane parallel with said top wall when said arm is in said position, said element having a pair of integral and adjacent sections defining an included angle approximately equal to the included angle between the neck and shaft of a femur.

3. The structure of claim 2 wherein the portion of said perineal post adjacent said top wall is substantially transparent to X-ray radiation, and wherein the upper portion of said post has a lengthwise groove into which said magnet is slidably receivable.

4. The structure of claim 2 wherein said upright member has a mounting plate and said top wall has a base plate, said mounting plate having a downwardly extending, headed pin and a keyhole-shaped opening spaced from said pin, and said base plate has an upwardly extending, headed screw and a keyhole-shaped opening spaced therefrom;
   the screw, the pin and the keyhole-shaped openings being arranged and located so that the screw is receivable through one of said openings when the pin is receivable through the other, whereby said upright member is removably and securely mounted upon said top wall.

References Cited by the Examiner

UNITED STATES PATENTS 2,115,096  4/38  Cleary _____ 250—59

RALPH G. NILSON, *Primary Examiner.*